United States Patent
Shintani

(10) Patent No.: US 6,627,329 B1
(45) Date of Patent: Sep. 30, 2003

(54) PLATED MATERIALS AND CONTACTS FOR CONNECTORS MADE BY USING THE SAME

(75) Inventor: Tadashi Shintani, Hachioji (JP)

(73) Assignee: Japan Aviation Electronics Industry, Toyko (JP)

(*) Notice: Subject to any disclaimer, the term of this patent is extended or adjusted under 35 U.S.C. 154(b) by 0 days.

(21) Appl. No.: 09/340,549

(22) Filed: Jun. 28, 1999

(30) Foreign Application Priority Data

Jun. 29, 1998 (JP) .............................. 10-182865

(51) Int. Cl.⁷ .................... B32B 15/04; B32B 15/08; B32B 15/20; H01R 13/03
(52) U.S. Cl. ................... 428/624; 428/672; 428/674; 428/457; 428/333; 439/886; 439/524
(58) Field of Search .................... 428/457, 333, 428/420, 672, 680, 681, 674, 624, 626, 675, 679; 174/126.1, 126.2; 439/524, 884, 886, 887

(56) References Cited

U.S. PATENT DOCUMENTS

| | | | | |
|---|---|---|---|---|
| 3,619,249 A | * | 11/1971 | Cannon | 117/62.1 |
| 5,178,916 A | * | 1/1993 | Chidsey et al. | 427/343 |
| 5,487,792 A | * | 1/1996 | King et al. | 136/256 |
| 5,650,088 A | * | 7/1997 | Kodama | 508/257 |
| 5,756,355 A | * | 5/1998 | Lang et al. | 435/7.21 |
| 5,853,797 A | * | 12/1998 | Fuchs et al. | 427/96 |
| 5,925,417 A | * | 7/1999 | Fousse | 427/352 |
| 6,102,521 A | * | 8/2000 | Halko et al. | 347/47 |
| 6,127,129 A | * | 10/2000 | Corn et al. | 435/6 |
| 6,180,288 B1 | * | 1/2001 | Everhart et al. | 430/2 |
| 6,395,454 B1 | * | 5/2002 | Piscevic | 430/311 |

FOREIGN PATENT DOCUMENTS

| | | | |
|---|---|---|---|
| JP | 1-115071 | * | 5/1989 |
| JP | 7-258894 | * | 10/1995 |

* cited by examiner

*Primary Examiner*—Michael LaVilla
(74) *Attorney, Agent, or Firm*—Michael Best & Friedrich LLC

(57) ABSTRACT

A plated material having a substrate, and a plating formed on the substrate, or on an undercoating formed on the substrate further has a layer formed on the plating from an organic compound capable of combining chemically with a component of the plating, and a lubricating layer formed on the layer of an organic compound. The lubricating layer is substantially a fluid film of a high molecular compound.

27 Claims, 1 Drawing Sheet

US 6,627,329 B1

PLATED MATERIALS AND CONTACTS FOR CONNECTORS MADE BY USING THE SAME

BACKGROUND OF THE INVENTION

1. Field of the Invention

This invention relates to a plated material, and more particularly, to a plated material having an electrically conductive plating and used for forming a contact for an electrical connector, and a contact formed by using the same.

2. Description of the Prior Art

Various types of connectors have been used for making connections in electronic devices. A gold plated material is used for making contacts for electronic parts, such as connectors, owing to its corrosion resistance and electrical conductivity, particularly when highly reliable contacts have to be made. Gold is, however, expensive, and adds to the cost of making contacts. It is, therefore, usual to form a gold plating with as small a thickness as possible. A gold plating having a small thickness, however, has a large number of pinholes through which corrosion is likely to occur to a substrate metal. It is, therefore, usual to give treatment for preventing such corrosion by, for example, forming a film of chromic acid, or a layer of an organic substance on a gold plating.

Another problem of a gold plating having a small thickness lies in its wear leading to the loss of gold, as is often the case with gold platings on connectors which are brought into engagement, or contact repeatedly for the operation of a device, such as an IC card. In a gold plating, the sealing of pinholes is effectively employed for preventing corrosion, but is hardly effective for preventing any such wear. A film or layer formed for preventing corrosion is not satisfactory for preventing any such wear. A lubricant oil is applied to the gold plating for protecting it against wear, but is not satisfactory for corrosion resistance, since corrosive gas molecules are so small as to pass through a film of oil.

Therefore, there has been a demand for a gold plated material having a surface treated for corrosion resistance and lubrication for wear resistance as well.

SUMMARY OF THE INVENTION

It is, therefore, an object of this invention to provide a plated material having a high protective power in a corrosive environment, and maintaining a constantly low contact resistance.

It is another object of this invention to provide a plated material having a lubricating property to impart a high level of wear resistance to a connector which is repeatedly engaged with another.

It is still another object of this invention to provide a plated material having a lubricating property to reduce a frictional force acting on a connector when it is engaged with another, or disengaged therefrom.

It is yet another object of this invention to provide a connector formed by using a plated material as defined above.

According to this invention, there is provided a plated material comprising a substrate, a plating formed on a surface selected from the substrate and an undercoating formed on the substrate, a bonding layer of an organic substance formed on the plating, and a lubricating layer formed on the bonding layer. The organic substance is an organic compound capable of combining chemically with a component of the plating. The lubricating layer consists essentially of a fluid film of a high molecular mass.

The bonding layer of an organic substance preferably consists essentially of a monomolecular film thereof. The organic substance is preferably an organic compound having a thiol (—SH) group.

The substrate is preferably of an electrical conductor, and more preferably of a metal. The metal is preferably at least one of copper, a copper alloy, iron, stainless steel, and a combination thereof.

The plating preferably contains gold, and more preferably consists essentially of a metal selected from gold-cobalt and gold-nickel alloys. The plating is preferably formed on the undercoating, and the undercoating is preferably of a metal of nickel or a nickel alloy.

According to this invention, there is also provided a contact for a connector comprising a substrate, a plating formed on a surface selected from the substrate and an undercoating formed on the substrate, a bonding layer of an organic substance formed on the plating, and a lubricating layer formed on the bonding layer. The organic substance is an organic compound capable of combining chemically with a component of the plating. The lubricating layer consisting essentially of a fluid film of a high molecular mass.

The bonding layer of an organic substance has a sufficiently small thickness to produce a tunnel effect. This and the fluidity of the lubricating layer ensure that the plated material, or contact maintain a low initial contact resistance.

PREFERRED EMBODIMENTS OF THE INVENTION

Figure 1:
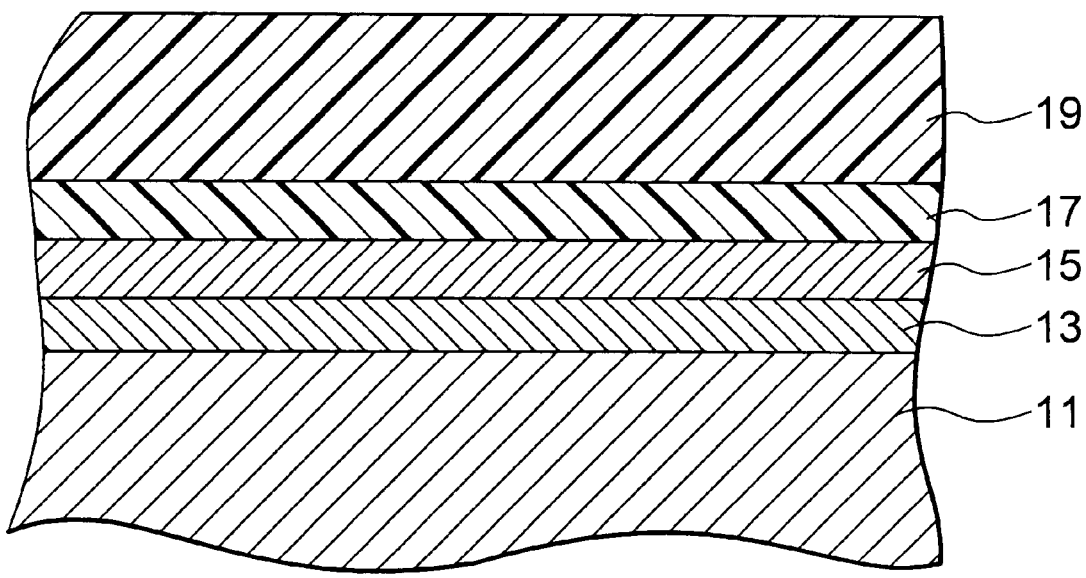
FIG. 1 is a fragmentary sectional view showing the surface structure of a plated material embodying this invention.

Description will first be made as regards the mechanisms of corrosion and wear occurring to a gold plated contact for a connector and the principles on which this invention is based for protecting it against corrosion and wear. Its corrosion is initiated by corrosive gases ($NO_2$, $SO_2$, $Cl_2$, etc.) and water adsorbed to the surface of its gold layer and forming an electrolyte thereon. If this electrolyte enters a pinhole in the gold layer, it forms a corrosion cell between the gold layer and the substrate metal, whereby the substrate metal is dissolved to form a deposit on the gold layer. This phenomenon can usually be avoided by closing or sealing the pinholes. It can alternatively be prevented by forming the gold layer and the walls of its pinholes with a hydrophobic surface and forming thereon a protective film for preventing the adsorption of corrosive gases and water thereto.

Wear occurs from the direct (or solid) contact of metals. Such solid contact can usually be avoided by forming a protective film on each contacting surface. The protective film is, however, likely to peel off the surface with an increase in frequency of contact and allow it to get worn, depending on the material or nature of the film. This is often the case with a film formed for protection against corrosion. A lubricant oil is, therefore, used to form on each contacting surface a thick layer healing any damage caused by its contact with another surface and making it resistant to wear despite their frequent contact.

Under these circumstances, we, the inventors of this invention, have found that the demand for a gold plated material having both corrosion and wear resistance can be met by a material having two surface layers formed on the surface of a gold plating, i.e. a thin film of an organic substance as a first layer for protection against corrosion, and a fluid film of a high molecular substance as a second layer for protection against wear.

FIG. 1 shows a gold plated material embodying this invention and including two surface layers as mentioned above. It comprises a substrate 11, an undercoating 13 formed on the substrate 11, a gold plating 15 formed on the undercoating 13, a first surface layer 17 formed on the gold plating 15 as a bonding layer of an organic substance, and a second surface layer 19 formed on the first surface layer 17 as a lubricating layer.

According to an important feature of this invention, the first surface layer 17 is a film of high density forming a strong bond to the gold plating 15 to ensure protection against corrosion. Therefore, it is preferably of an organic compound having a ringed or normal-chain thiol (—SH) group. It has a sufficiently small thickness to produce a tunnel effect to maintain a constantly low contact resistance, and more specifically, a thickness not exceeding 10 nm. It may be a monomolecular or polymeric film, and may, for example, be a monomolecular film of an organic substance having a molecular size of 10 nm. In case of a polymeric film, a thickness has to be 10 nm or less.

According to another important feature of this invention, the second surface layer 19 is a fluid film which can heal any damage caused by its contact with another surface in order to ensure its protection against wear. It is, therefore, a film of a high molecular substance, and may be formed from a polar compound, such as fatty acids, esters or amine compounds, or a non-polar compound, such as olefins or aromatic compounds. If a normal-chain compound is employed, it preferably has at least 8 carbon atoms. The second surface layer 19 may contain an assistant which protects the polymer against oxidation. The second surface layer, or oil layer has a thickness not specifically limited, but preferably not exceeding 500 $\mu$m. The fluidity of the layer 19 allows any portion thereof contacted by another material to flow away, so that no such contact may add to the contact resistance of the whole material. Although it may be possible from a microscopic standpoint that the layer 19 may have coarse or void portions regardless of its thickness, and allow corrosive gases to pass therethrough, those gases are blocked by the first surface layer 17.

The plated material of this invention will now be described in further detail based on a few specific examples embodying it. First of all, the following is an explanation of the methods employed for the tests of which the results will hereinafter be shown.

The initial contact resistance was determined at 10 points by pressing a gold plated probe on a Pt—Ir alloy under a contact load of 50 g and passing a current of 10 mA at an open-circuit voltage of 20 mV, and was employed as a measure for evaluation as to the stability of contact resistance. The results were classified by the difference of contact resistance on the gold plated surface, and will be shown by the symbols "○" meaning that the difference was not greater than 2 m$\Omega$, "Δ" meaning that it was not greater than 4 m$\Omega$, and "X" meaning that it was greater than 4 m$\Omega$.

Sulfurous anhydride ($SO_2$) and salt spray tests were conducted for evaluation as to corrosion resistance. The sulfurous anhydride tests were conducted by employing a gas containing 10±3 ppm of $SO_2$, and continued at a temperature of 40±2° C. and a high humidity for 240 hours. The salt spray tests were conducted by employing a 5% NaCl solution, and continued at 35° C. for 48 hours. The results were determined by the inspection of the outward appearance of the sample as tested, and will be shown by the symbols "○" meaning that no product of corrosion was found, "Δ" meaning that a product of corrosion was found in a small quantity, and "X" meaning that the product of corrosion was found in a large quantity.

The wear resistance of each sample was determined by rubbing a gold plated probe against the sample 5,000 times under a load of 100 g, and obtaining its coefficient of friction.

EXAMPLE 1

A sample was prepared by forming a nickel plating having a thickness of 2 $\mu$m on a coupon of phosphor bronze measuring 2 by 1 by 0.3 cm in a sulfamic acid bath, and forming thereon a gold-cobalt alloy plating having a thickness of 0.2 $\mu$m, a gold content of at least 99% and a eutectoid cobalt content of 0.1 to 0.2% in a plating bath having the composition shown in Table 1 below under the conditions shown in Table 1. The sample was dipped in an aqueous solution of a sodium salt of mercaptobenzothiazole containing it at a concentration of 5 g/l, and having a pH of 10 and a temperature of 50° C., and after 60 seconds, it was rinsed with water, and dried, whereby a monomolecular film of mercaptobenzothiazole was formed thereon as a bonding layer of an organic substance defining a first surface layer 17 as shown in FIG. 1. Then, the sample was dipped in a solution containing 5% by weight of a poly-α-olefin oil in isopropyl bromide and kept at room temperature, and after 10 seconds, it was dried, whereby a poly-α-olefin oil layer having a thickness of about 400 $\mu$m was formed as a second surface layer 19. The thickness of the oil layer was calculated from the weight of the oil used for forming the layer and the surface area of the coupon.

TABLE 1

| Plating Bath Composition | | |
|---|---|---|
| Liquid Composition | Components | Concentration |
| Metal gold | $KAu(CN)_2$ | 5–20 g/l |
| Portion cobalt | cobalt citrate | 0.3–0.5 g/l |
| Supporting Salt | potassium citrate | 90–720 g/l |
| Organic Lubricating Agent | | Small Amount |
| Surface Active Agent | | Small Amount |

| Plating Condition | |
|---|---|
| Cathodic Current Density | 4 A/dm$^2$ |
| Bath Temperature | 40° C. |
| Plating Time | Appropriate Time (40 sec in a thickness of 0.2 $\mu$m) |

EXAMPLE 2

A sample prepared by repeating EXAMPLE 1 was dipped or immersed for 30 seconds in an aqueous solution of octadecanethiol having a concentration of 0.2% by weight, containing an emulsifying agent and having a temperature of 50° C. Thereafter, the sample was rinsed with water and dried to form a monomolecular film of octadecanethiol as a first surface layer 17. Then, the sample was dipped in a solution containing 2% by weight of a diester oil (dioctyl azelate) in isopropyl bromide and kept at room temperature for 5 seconds. Thereafter, the sample was dried. As a result, a diester oil layer was formed which had a thickness of about 200 $\mu$m as a second surface layer 19.

EXAMPLE 3

A sample prepared by repeating EXAMPLE 1 was dipped in an aqueous solution of 1-phenyl-5-mercapto-1, H tetrazole having a concentration of 5 g/l, and having a pH of 9.5 and a temperature of 70° C. for 30 seconds.

Thereafter, the sample was rinsed with water and dried, thereby a monomolecular layer of 1-phenyl-5-mercapto-1, H tetrazole was formed as a first surface layer 17. Then, the sample was dipped in a solution containing 1% by weight of a polyphenyl ether in isopropyl bromide and kept at room temperature for 5 seconds. Thereafter, the sample was dried, as a result, a polyphenyl ether layer was formed which had a thickness of about 100 μm as a second surface layer 19.

COMPARATIVE EXAMPLE 1

A sample prepared by repeating EXAMPLE 1 was treated with a commercially available electrolytic chromic acid type sealing agent.

COMPARATIVE EXAMPLE 2

A commercially available contact oil having corrosion resistance, as well as lubricating property, was used to form a lubricating layer on a sample prepared by repeating EXAMPLE 1.

COMPARATIVE EXAMPLE 3

Only a first surface layer of mercaptobenzothiazole was formed on a sample prepared by repeating EXAMPLE 1.

COMPARATIVE EXAMPLE 4

Only a second surface layer of a poly-α-olefin oil was formed on a sample prepared by repeating EXAMPLE 1.

The test results are shown in Table 2.

TABLE 2

|  |  | Initial Contact Resistance | Test of $SO_2$ gas | Salt Spray Test | Coefficient of Friction |
|---|---|---|---|---|---|
| Samples of Present Invention | 1 | ○ | ○ | ○ | 0.2 |
|  | 2 | ○ | ○ | ○ | 0.2 |
|  | 3 | ○ | ○ | ○ | 0.1 |
| Comparative Examples | 1 | Δ | Δ | ○ | 0.5 |
|  | 2 | Δ | Δ | ○ | 0.2 |
|  | 3 | ○ | ○ | ○ | 0.5 |
|  | 4 | ○ | Δ | Δ | 0.2 |

As is obvious from Table 2, the products embodying this invention were superior to those of the Comparative Examples in all of the initial contact resistance, the corrosion resistance and the coefficient of friction.

What is claimed is:

1. A contact for a connector comprising:
   a base metal;
   a plating formed on a surface of the base metal;
   a bonding layer of a corrosion resistant organic substance formed on the plating and bonded thereto for inhibiting corrosion of the base metal; and
   a lubricating layer formed on the bonding layer;
   the organic substance being a corrosion resistant organic compound having a thiol (—SH) group and being capable of combining chemically with a component of the plating, the lubricating layer consisting essentially of a fluid film of a high molecular mass compound.

2. A contact for a connector as set forth in claim 1, wherein said bonding layer consists essentially of monomolecular film of said organic substance, said monomolecular film having a thickness of one molecule and being composed of molecules identical with one another.

3. A contact as set forth in claim 2, wherein said plating comprises gold.

4. A contact as set forth in claim 3, wherein said plating consists essentially of an alloy selected from a gold-cobalt alloy and a gold-nickel alloy.

5. A contact as set forth in claim 1, in which the lubricating layer adds no more than a negligible amount to a contact resistance, as measured when the contact and another contact press against each other at room temperature.

6. A contact as set forth in claim 1, which the lubricating layer is fluid at room temperature.

7. A contact as set forth in claim 1, in which the high molecular mass compound is selected from the group consisting of a poly-alpha-olefin, a diester oil and a polyphenyl ether.

8. A contact as set forth in claim 1, in which the lubricating layer has a thickness not exceeding 500 micrometer.

9. A contact as set forth in claim 1, in which the bonding layer is the product of chemically reacting gold with a thiol compound selected from the group consisting of mercaptobenzothiazole, octadecanethiol, and 1-phenyl-5-mercapto-1, H tetrazole.

10. A contact as set forth in claim 1, in which the bonding layer has a thickness not exceeding 10 nanometer.

11. A contact for a connector comprising:
    a base material;
    an undercoating formed on the base material;
    a plating formed on a surface of the undercoating;
    a bonding layer of a corrosion resistant organic substance formed on and bonded to the plating for inhibiting corrosion of the undercoating; and
    a lubricating layer formed on the bonding layer, the organic substance being an organic compound having a thiol (—SH) group in which a combination must be able to occur with a component as part of the plating, the lubricating layer consisting essentially of a fluid film of a high molecular mass.

12. A contact for a connector as set forth in claim 11, wherein said bonding layer consists essentially of a monomolecular film of said organic substance, said monomolecular film having a thickness of one molecule and being composed of molecules which are identical with one another.

13. A contact as set forth in claim 12, wherein said base material is an electrical conductor.

14. A contact as set forth in claim 13, wherein said conductor is a metallic material.

15. A contact as set forth in claim 12, wherein said plating comprises gold.

16. A contact as set forth in claim 15, wherein said plating consists essentially of an alloy selected from a group consisting of gold-cobalt alloy and a gold-nickel alloy.

17. A contact as set forth in claim 15, wherein said plating is formed on said undercoating, said undercoating consisting essentially of a metal selected from a group consisting of nickel and a nickel alloy.

18. A contact for a connector comprising:
    a base material;
    an undercoating formed on the base material;
    a plating formed on a surface of the undercoating;

a bonding layer of an organic substance formed on the plating and bonded thereon; and a lubricating layer formed on the bonding layer, the organic substance being an organic compound having a thiol (—SH) group in which a combination must be able to occur with a component as part of the plating, the lubricating layer consisting essentially of a fluid film of a high molecular mass;

wherein said base material is an electrical conductor, said electric conductor is a metallic material; and said metallic material is selected from a group consisting of at least one of copper, a copper alloy, iron, and stainless steel.

19. A plated material comprising:

a base material;

an undercoating formed on a surface of the base material;

a plating formed on a surface of the undercoating;

a bonding layer of an organic substance formed on the plating and bonded thereon for inhibiting corrosion of the undercoating; and a lubricating layer formed on the bonding layer, the organic substance being an organic compound having a thiol (—SH) group and being capable of combining chemically with a component of the plating, the lubricating layer consisting essentially of a fluid film of a high molecular mass compound, which compound is selected from the group consisting of a fatty acid, an ester, an olefin or an aromatic.

20. A plated material as set forth in claim 19, wherein said bonding layer consists essentially of a monomolecular film of said organic substance, said monomolecular film having a thickness of one molecule and being composed of molecules which are identical with one another.

21. A plated material as set forth in claim 20, wherein said base material is an electrical conductor.

22. A plated material as set forth in claim 21, wherein said conductor is a metallic material.

23. A plated material as set forth in claim 22, wherein said plating comprises gold.

24. A plated material as set forth in claim 23, wherein said plating consists essentially of an alloy selected from a group consisting of a gold-cobalt alloy, and gold-nickel alloy.

25. A plated material as set forth in claim 23, wherein said under coating consists essentially of a metal selected from a group consisting of nickel and a nickel alloy.

26. A plated material as set forth in claim 25, wherein said metallic material is at least one selected from a group consisting of copper, a copper alloy, iron, and stainless steel.

27. A plated material as set forth in claim 19, said plated material being a contact inserted into a connector.

* * * * *